United States Patent
Inoue et al.

(10) Patent No.: US 12,365,426 B2
(45) Date of Patent: Jul. 22, 2025

(54) COLLISION INFORMATION PROVIDING SYSTEM, COLLISION JUDGING SYSTEM, AND MARINE VESSEL

(71) Applicant: YAMAHA HATSUDOKI KABUSHIKI KAISHA, Iwata (JP)

(72) Inventors: Hiroshi Inoue, Shizuoka (JP); Yuuta Mori, Shizuoka (JP); Shintaro Aoyagi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 286 days.

(21) Appl. No.: 18/129,111

(22) Filed: Mar. 31, 2023

(65) Prior Publication Data

US 2023/0322341 A1    Oct. 12, 2023

(30) Foreign Application Priority Data

Apr. 11, 2022  (JP) .............................. 2022-065228
Feb. 13, 2023  (JP) .............................. 2023-019830

(51) Int. Cl.
*B63B 79/40*  (2020.01)
*B63B 79/15*  (2020.01)
*G07C 5/08*  (2006.01)
*G06V 20/50*  (2022.01)

(52) U.S. Cl.
CPC .............. *B63B 79/40* (2020.01); *B63B 79/15* (2020.01); *G07C 5/0808* (2013.01); *G06V 20/50* (2022.01)

(58) Field of Classification Search
CPC ....... B63B 79/40; B63B 79/15; G07C 5/0808; G07C 5/085; G06V 20/50
See application file for complete search history.

(56) References Cited

U.S. PATENT DOCUMENTS 10,214,271 B1 *  2/2019  Gonring .................. B63B 79/10
2008/0254690 A1  10/2008  Kishibata
2011/0144912 A1 *  6/2011  Lee .......................... G08G 3/00
                                                                 340/985

FOREIGN PATENT DOCUMENTS

JP   2008-260413 A   10/2008
JP   2013-123954 A   6/2013

* cited by examiner

*Primary Examiner* — Michael V Kerrigan
(74) *Attorney, Agent, or Firm* — Keating & Bennett, LLP

(57) ABSTRACT

A collision information providing system provides information about a collision with a marine vessel, and includes a controller configured or programmed to function as a judging unit to judge whether or not there has been a collision of an object with a marine vessel, an information obtaining unit to obtain information about the collision when the judging unit judges that there has been the collision, and a providing unit to provide the information obtained by the information obtaining unit.

32 Claims, 7 Drawing Sheets

*FIG. 5*

| CHANGE SPEED OF INCLINATION ANGLE [%/s] | MAXIMUM ANGLE (%) (CHANGE AMOUNT OF INCLINATION ANGLE FROM BEFORE HIT) | HIT LEVEL |
| --- | --- | --- |
| 100 OR MORE | 5 OR MORE | 0 |
| 100 OR MORE | 10 OR MORE | 1 |
| 100 OR MORE | 20 OR MORE | 2 |
| 100 OR MORE | 50 OR MORE | 3 |
| 100 OR MORE | 100 OR MORE | 4 |
| 100 OR MORE | 120 OR MORE | 5 |
| 150 OR MORE | 120 OR MORE | 6 |
| 250 OR MORE | 120 OR MORE | 7 |
| 400 OR MORE | 120 OR MORE | 8 |
| 600 OR MORE | 120 OR MORE | 9 |

COLLISION INFORMATION PROVIDING SYSTEM, COLLISION JUDGING SYSTEM, AND MARINE VESSEL

CROSS REFERENCE TO RELATED APPLICATIONS

This application claims the benefit of priority to Japanese Patent Application No. 2022-065228, filed on Apr. 11, 2022 and Japanese Patent Application No. 2023-019830, filed on Feb. 13, 2023. The entire contents of these applications are hereby incorporated herein by reference.

BACKGROUND OF THE INVENTION

1. Field of the Invention

The present invention relates to a collision information providing system, a collision judging system, and a marine vessel.

2. Description of the Related Art

Systems for detecting a collision between a marine vessel and an object are known. For example, a judging apparatus, which is disclosed in Japanese Laid-Open Patent Publication (kokai) No. 2013-123954, detects an acceleration acting on a hull, and judges based on the detected acceleration that the hull has collided with something and/or capsized. Further, a collision management apparatus, which is disclosed in Japanese Laid-Open Patent Publication (kokai) No. 2008-260413, judges whether or not there is a collision with an outboard motor based on a change rate of a vertical tilting angle of the outboard motor and a change amount of tilting.

In recent years, rental and sharing of marine vessels have spread. In general, a lender who lends out a marine vessel desires to in detail and quickly obtain information about whether or not an object has collided with the marine vessel that has been lent out and the state of the collision. There is room for improvement from the viewpoint of smoothly providing information about the collision with the marine vessel to the lender who has lent out the marine vessel.

SUMMARY OF THE INVENTION

Preferred embodiments of the present invention provide collision information providing systems, collision judging systems, and marine vessels that are each able to provide information about a collision with a marine vessel.

According to a preferred embodiment of the present invention, a collision information providing system includes a controller configured or programmed to function as a judging unit to judge whether or not there has been a collision of an object with a marine vessel, an information obtaining unit to obtain information about the collision when the judging unit judges that there has been the collision, and a providing unit to provide the information obtained by the information obtaining unit.

According to another preferred embodiment of the present invention, a collision judging system includes a controller configured or programmed to function as a judging unit to judge whether or not there has been a collision of an object with a marine vessel propulsion device including an engine and a propeller. In a case that a condition that a rotation number of the engine becomes lower than a second threshold rotation number within a fifth predetermined period of time is satisfied, the judging unit is configured or programmed to judge that there has been the collision of the object with the propeller.

According to another preferred embodiment of the present invention, a collision judging system includes a controller configured or programmed to function as a judging unit to judge whether or not there has been a collision of an object with a propeller of a marine vessel propulsion device. In a case that a first deviation of a throttle opening of an engine of the marine vessel propulsion device during a twentieth predetermined period of time retroactive from a present time does not exceed a third predetermined amount and a first deviation of a rotation number of the engine during a seventeenth predetermined period of time retroactive from the present time is within an eighth threshold rotation number, when a moving average of an intake pressure of the engine exceeds a predetermined intake pressure threshold and the rotation number of the engine has decreased so that a second deviation of the rotation number of the engine during a nineteenth predetermined period of time retroactive from the present time exceeds a ninth threshold rotation number and then the rotation number of the engine has increased so that the second deviation of the rotation number of the engine exceeds a tenth threshold rotation number, the judging unit is configured or programmed to judge that there has been the collision of the object with the propeller.

According to another preferred embodiment of the present invention, a collision judging system includes an acceleration sensor to obtain an acceleration in a horizontal direction acting on a marine vessel, and a controller configured or programmed to function as a judging unit to judge whether or not there has been a collision of an object with the marine vessel. In a case that the acceleration obtained by the acceleration sensor exceeds a third predetermined acceleration, the judging unit is configured or programmed to judge that there has been the collision of the object with the marine vessel.

According to another preferred embodiment of the present invention, a collision judging system includes a speed sensor to obtain a speed of a marine vessel including a hull and at least one marine vessel propulsion device attached to the hull, an inclination angle sensor to obtain an inclination angle of the marine vessel propulsion device with respect to the hull, and a controller configured or programmed to function as a judging unit to judge whether or not there has been a collision of an object with the marine vessel propulsion device. The judging unit is configured or programmed to judge that there has been the collision of the object with the marine vessel propulsion device based on a condition that in a state in which the speed obtained by the speed sensor is equal to or higher than a second predetermined speed, the inclination angle obtained by the inclination angle sensor has changed by more than a second predetermined amount within a fourteenth predetermined period of time.

According to another preferred embodiment of the present invention, a marine vessel includes the collision information providing system described above.

According to another preferred embodiment of the present invention, a marine vessel includes the collision judging system described above.

According to the preferred embodiments of the present invention, in the case of being judged that the object has collided with the marine vessel, the information about the collision is obtained, and the obtained information is provided by storing it in a storage, and transmitting it to the outside, or the like. Whether or not the object has collided with the marine vessel is judged based on whether or not there is a propeller hit, a marine vessel hit, or a driftwood hit. As a result, it is possible to provide the information about the collision with the marine vessel.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a diagram that shows a level table in which a driftwood hit level is specified.

DETAILED DESCRIPTION OF THE PREFERRED EMBODIMENTS

Hereinafter, preferred embodiments of the present invention will be described with reference to the drawings.

Figure 1:
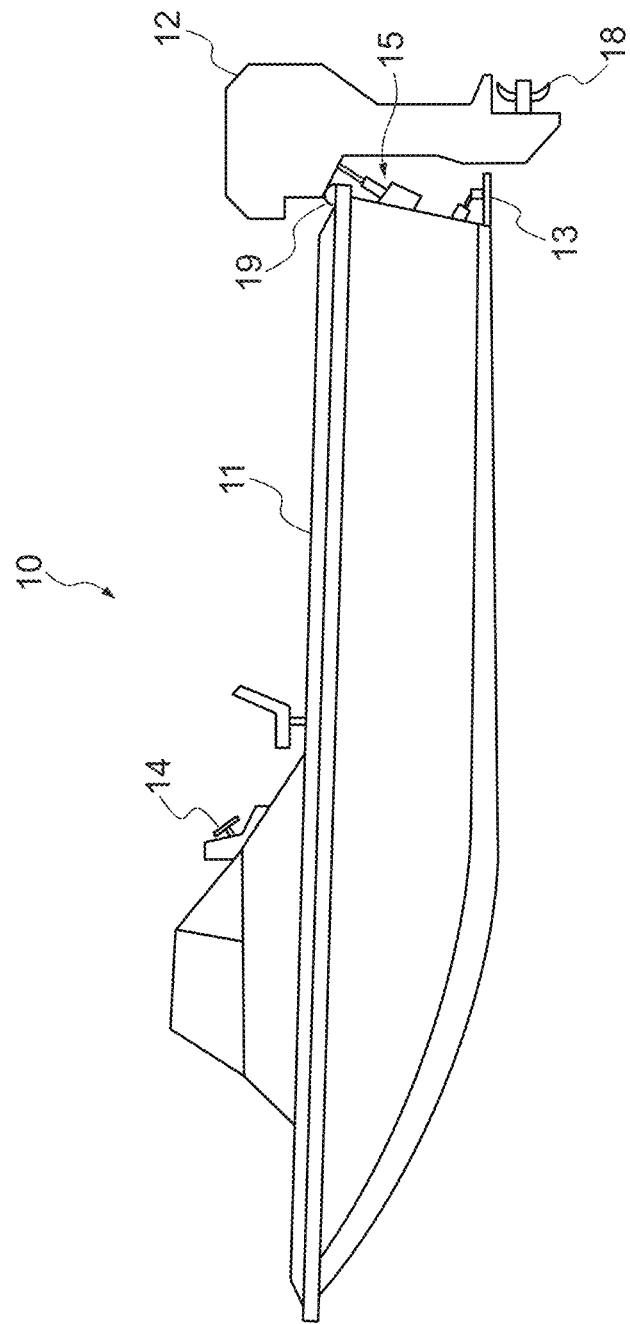
FIG. 1 is a side view of a marine vessel to which a collision information providing system and a collision judging system according to a preferred embodiment of the present invention is applied.

FIG. 1 is a side view of a marine vessel to which a collision information providing system and a collision judging system according to a preferred embodiment of the present invention is applied. A marine vessel 10 shown in FIG. 1 is a planing boat and includes a hull 11, a plurality of outboard motors 12 that function as marine vessel propulsion devices and are mounted on the hull 11, and a plurality of trim tabs 13. A steering wheel 14 is provided near a maneuvering seat of the hull 11.

The respective outboard motors 12 are mounted side by side on the stern of the hull 11. Each of the outboard motors 12 obtains a propulsion force (a thrust) from a propeller 18 (including propulsion blades) which is rotated by a driving force of a corresponding engine 42 (see FIG. 2). It should be noted that the number of the outboard motors 12 does not matter.

As shown in FIG. 1, each outboard motor 12 is attached to the hull 11 via an attachment unit 19, and rotates about a substantially vertical steering shaft (not shown) in the attachment unit 19 in response to an operation of the steering wheel 14. As a result, the marine vessel 10 is steered. Each trim tab 13 is attached to the stern of the hull 11 and swings about a substantially horizontal swing shaft (not shown) at the stern. As a result, the lift generated at the stern of the hull 11 is adjusted and the attitude of the hull 11 is controlled.

The attachment unit 19 includes a PTT (Power Trim and Tilt) unit 15. The PTT unit 15 rotates the outboard motor 12 about a tilt shaft (not shown) with respect to the hull 11 and changes an inclination angle (a trim angle or a tilt angle) of the outboard motor 12 with respect to the hull 11.

Figure 2:
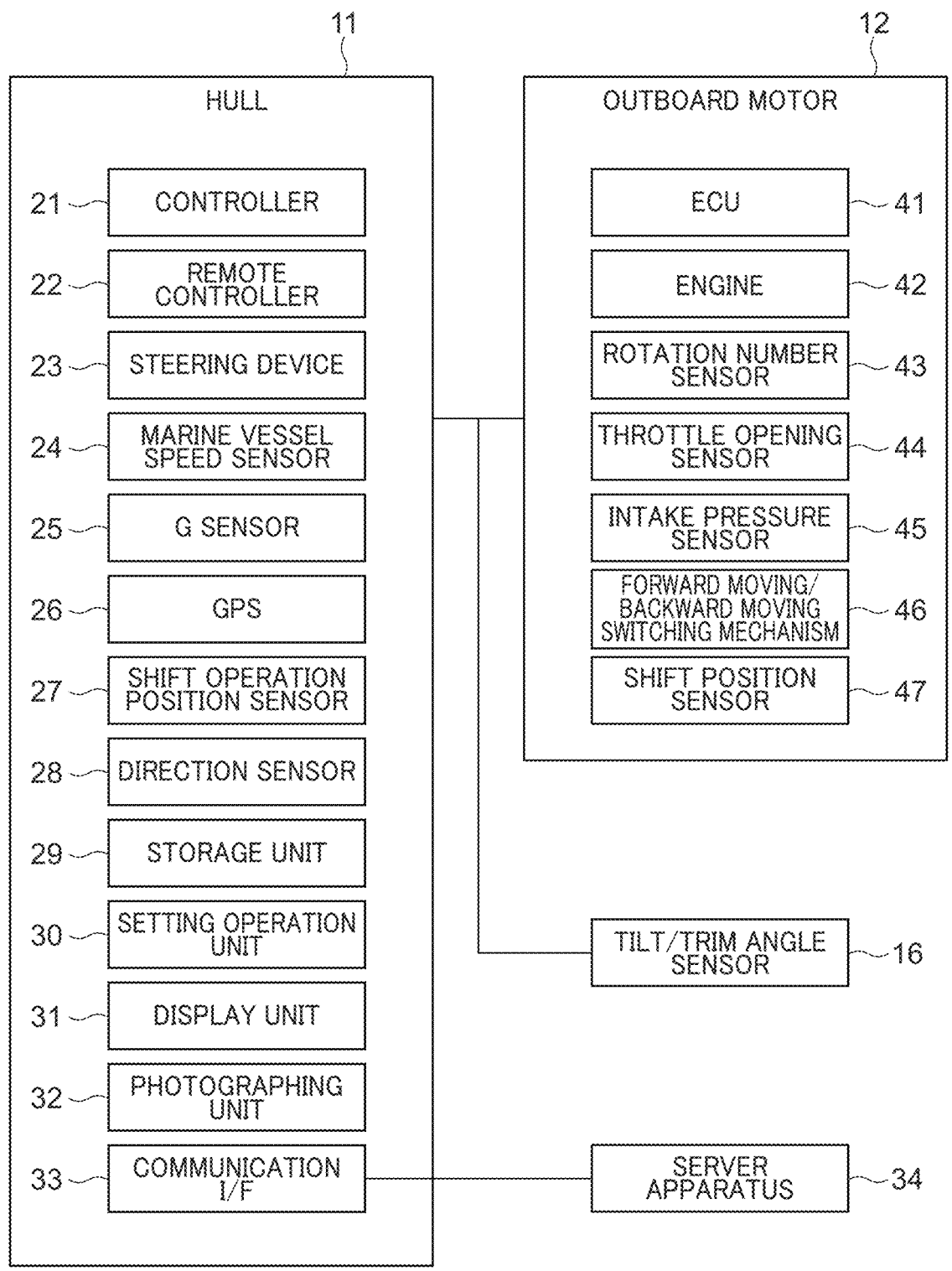
FIG. 2 is a block diagram for schematically explaining respective components included in the marine vessel shown in FIG. 1.

FIG. 2 is a block diagram for schematically explaining respective components included in the marine vessel 10. The hull 11 includes a controller 21, a remote controller 22, a steering device 23, a marine vessel speed sensor 24, a G sensor 25, a GPS (Global Positioning System) 26, a shift operation position sensor 27, a direction sensor 28, a storage unit 29, a setting operation unit 30, a display unit 31, a photographing unit 32, and a communication I/F (interface) 33.

The outboard motor 12 includes an ECU (Engine Control Unit) 41, the engine 42, a rotation number sensor 43, a throttle opening sensor 44, an intake pressure sensor 45, a forward moving/backward moving switching mechanism 46, and a shift position sensor 47.

The PTT unit 15 includes a tilt/trim angle sensor 16. The tilt/trim angle sensor 16, which functions as an inclination angle sensor, detects the inclination angle of the outboard motor 12 with respect to the hull 11. The inclination angle is an angle of the outboard motor 12 based on a position of the lowest point around the tilt shaft. The tilt/trim angle sensor 16 includes, for example, a potentiometer.

The controller 21 is, for example, a BCU (Boat Control Unit). The controller 21 controls operations of the respective components of the marine vessel 10 according to various kinds of programs. The controller 21 includes a CPU (Central Processing Unit) (not shown), a ROM (Read Only Memory) (not shown), a RAM (Random Access Memory) (not shown), a timer (not shown), etc. Control programs executed by the CPU are stored in the ROM. The RAM provides a working area when the CPU executes the control program.

The remote controller 22 includes levers (not shown) corresponding to the respective outboard motors 12. By operating each lever, a marine vessel user is able to switch a direction of the thrust generated by the corresponding outboard motor 3 between a forward moving direction and a backward moving direction, and adjust the output of the corresponding outboard motor 3 so as to adjust a marine vessel speed of the marine vessel 10.

The steering device 23 enables the marine vessel user to determine the course of the marine vessel 10. The marine vessel user is able to change the course of the marine vessel 10 to left or right by rotatably operating the steering wheel 14 of the steering device 23 leftward or rightward. The marine vessel speed sensor 24, which functions as a speed sensor, measures a speed of the marine vessel 10 (the marine vessel speed). The G sensor 25, which functions as an acceleration sensor, measures accelerations acting on the hull 11 in three axial directions. The GPS 26 measures a position of the marine vessel 10 in the earth coordinate system. It should be noted that the controller 21 may obtain the marine vessel speed of the marine vessel 10 from GPS signals. Alternatively, the controller 21 may obtain the marine vessel speed of the marine vessel 10 by prediction based on an engine rotation number (a rotation number of the engine 42) or the like.

The shift operation position sensor 27 detects a shift operation position, which is instructed to the forward moving/backward moving switching mechanism 46. The shift operation position is issued by an operation of the remote controller 22. The direction sensor 28 detects a direction of the marine vessel 10 (an azimuth of the marine vessel 10). The storage unit 29 is a non-volatile memory. The setting operation unit 30 includes an operation piece (not shown) to perform operations related to marine vessel maneuvering, a PTT operation switch (not shown), a setting operation piece (not shown) to perform various kinds of settings, and an inputting operation piece (not shown) to input various kinds of instructions. The display unit 31 is a display to display various kinds of information, and also functions as a touch panel to accept inputs from the marine vessel user. The photographing unit 32 is a camera that is able to photograph moving images and still images. The communication I/F 33 has a communication function via the Internet or the like, and wirelessly communicates with an external apparatus such as a server apparatus 34. It should be noted that the communication I/F 33 may have a wired communication function.

The ECU 41 is a controller for the engine 42 and controls the engine 42 according to control signals issued by the controller 21. The rotation number sensor 43 measures the rotation number of the engine 42. The throttle opening sensor 44 detects an opening of a throttle valve (not shown) of the engine 42. The intake pressure sensor 45 measures an intake pressure of the engine 42.

The forward moving/backward moving switching mechanism 46 includes a shift link mechanism (not shown) and a clutch mechanism (not shown), and the engine 42 and the clutch mechanism are connected by a drive shaft (not shown). The ECU 41 switches a shift position of the forward moving/backward moving switching mechanism 46 among a forward state (F), a reverse state (R), and a neutral state (N) in response to the shift operation position issued by the operation of the remote controller 22. The shift position sensor 47 detects the current shift position of the forward moving/backward moving switching mechanism 46.

In the marine vessel 10, the respective components 21 to 33 and 41 to 47 described above are connected to each other by a CAN (Control Area Network) that is a network in which a plurality of nodes are individually connected to a bus. The detection results and the measurement results, which are obtained by the components 24 to 28, 43 to 45, and 47, are transmitted to the controller 21. It should be noted that the respective components of the marine vessel 10 may be connected to each other not by the CAN but by a LAN (Local Area Network) such as Ethernet (registered trademark) that provides connections via a network device, or the respective components of the marine vessel 10 may be directly connected to each other.

In addition, the hull 11 or the outboard motor 12 includes various actuators (not shown). The various actuators include a mechanism to rotate each outboard motor 12 around the steering shaft, a mechanism to switch the shift position of the forward moving/backward moving switching mechanism 46, a mechanism to adjust a throttle opening (the opening of the throttle valve), a mechanism to drive the trim tabs 13, etc. The various actuators also include actuators to realize automatic pilot (automatic marine vessel maneuvering).

Figure 3:
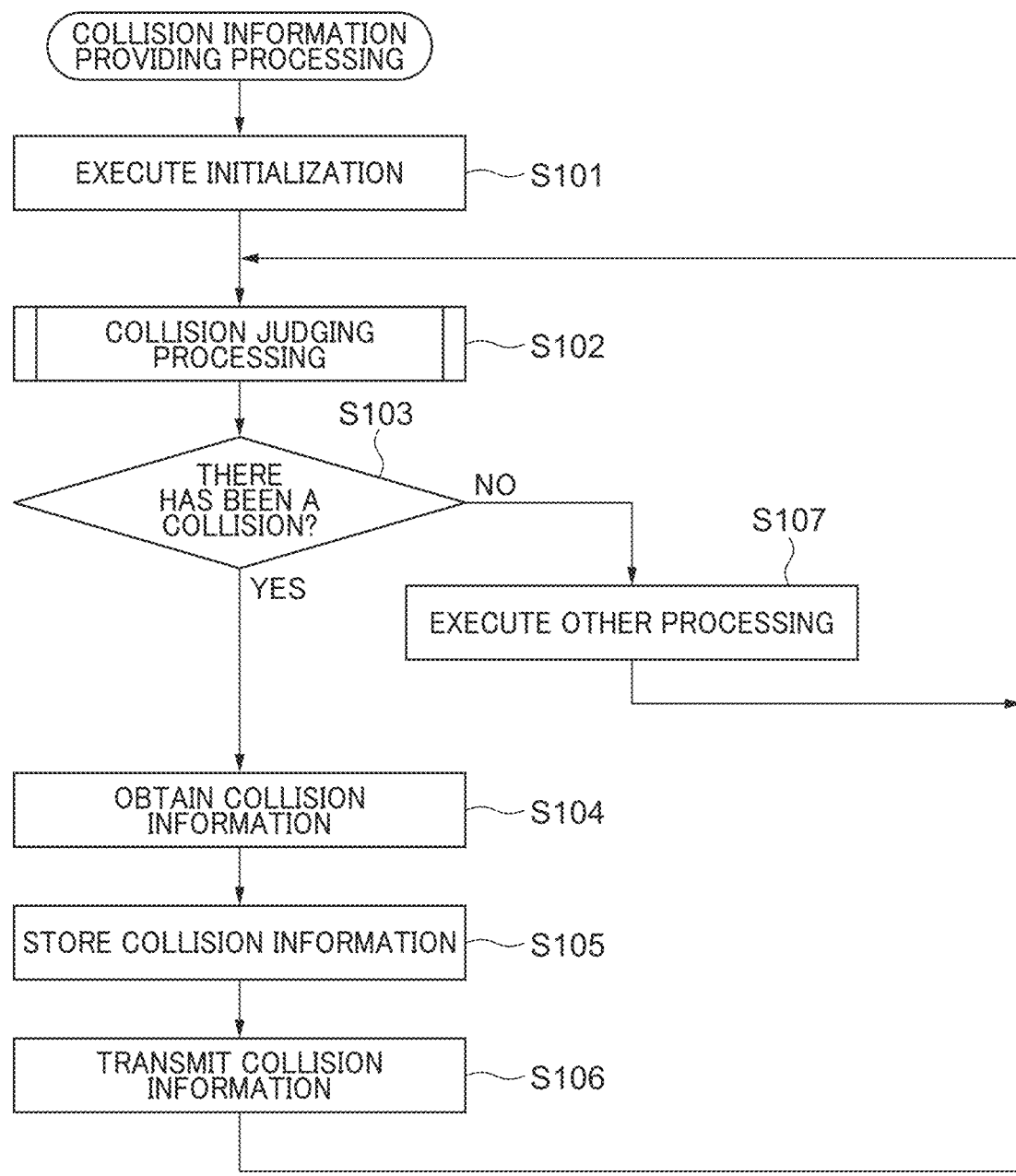
FIG. 3 is a flowchart that shows the flow of a collision information providing process.

FIG. 3 is a flowchart that shows the flow of a collision information providing process. In the controller 21, the collision information providing process is realized by the CPU expanding a program, which is stored in the ROM, to the RAM and executing the program. The collision information providing process is activated, for example, by turning on a main switch (not shown) of the marine vessel 10.

In a step S101, the controller 21 executes an initialization of the G sensor 25. In the initialization of the G sensor 25, for example, a vertical direction and a horizontal direction are defined, and are set in the G sensor 25. Therefore, it is preferable that the initialization of the G sensor 25 is executed while the marine vessel 10 is stationary. As a result, it is possible to obtain an acceleration in the vertical direction and an acceleration in the horizontal direction. In the case that the G sensor 25 is fixed so that the vertical direction and the horizontal direction are known in advance, the initialization of the G sensor 25 becomes unnecessary. It should be noted that forward/backward and leftward/rightward may be defined after the start of navigating. For example, a traveling direction (a navigating direction) of the marine vessel 10 when a navigating speed exceeds a certain value may be defined as a forward direction.

In a step S102, the controller 21 executes a collision judging process (described below with reference to FIG. 4). In a step S103, the controller 21 judges based on the result of the collision judging process performed in the step S102 whether or not there has been a collision in the marine vessel 10. Here, the type of the collision judged in the step S103 includes a collision of an object with the propeller 18 (hereinafter, referred to as "a propeller hit"), a collision of an object with the marine vessel 10 (mainly with the hull 11) (hereinafter, referred to as "a marine vessel hit"), and a collision of an object with the outboard motor 12 (hereinafter, referred to as "a driftwood hit"). The details of the propeller hit, the marine vessel hit, and the driftwood hit will be described below with reference to FIG. 4. Furthermore, although the object that collides with the outboard motor 12 is not limited to driftwood, hits of various objects with the outboard motor 12 are collectively referred to as the driftwood hit.

In the case of being judged in the step S103 that there is no collision, the controller 21 executes another process in a step S107 and then returns the collision information providing process to the step S102. In the other process executed in the step S107, the controller 21 executes, for example, a setting process and a setting change process that correspond to operations performed by the marine vessel user, as well as a process to end the collision information providing process.

In the case of being judged in the step S103 that there has been the collision, in a step S104, the controller 21 obtains "collision information" that is information about the collision. The collision information includes the type of the collision, a collision occurrence time, collision occurrence location information, etc. In addition, the collision information includes an acceleration level and an acceleration direction that are detected by the G sensor 25 before and after the marine vessel hit occurs. Moreover, the collision information includes a driftwood hit level (described below with reference to FIG. 5) when the driftwood hit occurs. Furthermore, the collision information includes moving image information for a certain period of time before and after the collision occurs. The photographing unit 32 constantly photographs moving images in a plurality of directions, and the photographed moving images are temporarily stored in a memory (not shown). The controller 21 extracts the moving images for a certain period of time before and after a point in time when the collision occurs, and includes them in the collision information. For example, the controller 21 may obtain the moving images for a first predetermined period of time which includes a point in time when it is judged that there has been the collision (for example, a period of time from a point in time about 30 seconds before the collision occurs to a point in time about 5 seconds after the collision occurs) as a portion of the collision information.

In addition, the collision information may include navigation information when the collision occurs (the navigating speed, the navigating direction, an operation state of the engine 42, etc.), audio information, weather information, the still images, etc. For example, the controller 21 may obtain information, which indicates an operation state of the marine vessel 10 for a second predetermined period of time including the point in time when it is judged that there has been the collision, as a portion of the collision information.

In a step S105, the controller 21 causes the storage unit 29 to store the obtained collision information. In a step S106, the controller 21 transmits the obtained collision information to the outside. For example, the controller 21 wirelessly transmits the obtained collision information to the server apparatus 34 through the communication I/F 33 that functions as a communicator.

The collision information is provided by executing the step S105 and the step S106. However, it is not essential that both the step S105 and the step S106 are executed. After executing the step S106, the controller 21 returns the collision information providing process to the step S102. It should be noted that the collision information (for example, the type of the collision, the collision occurrence time, and the collision occurrence location information) may be displayed on the display unit 31. Alternatively, the collision information may be informed by voice to the extent possible.

Figure 4:
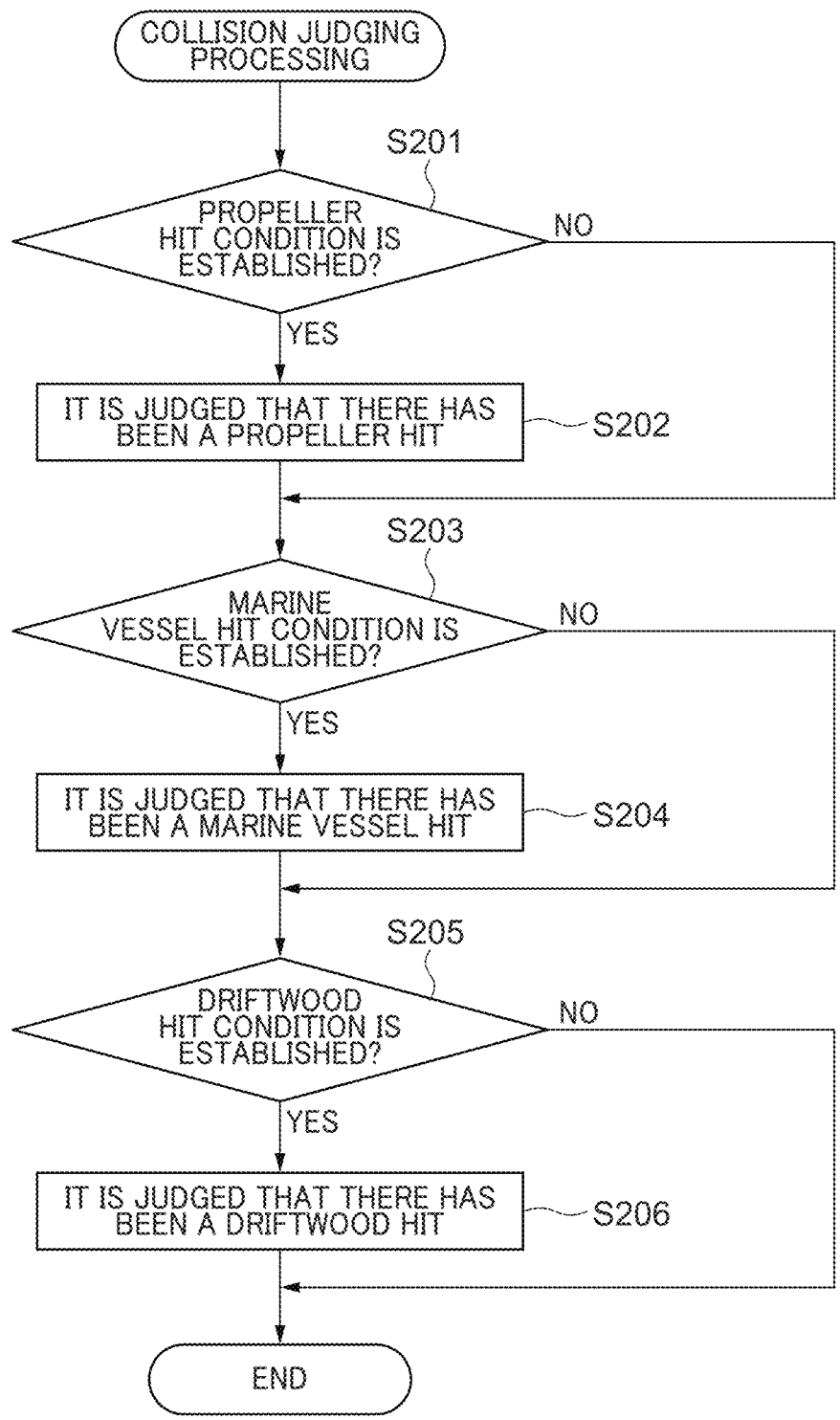
FIG. 4 is a flowchart that shows the flow of a collision judging process.

FIG. 4 is a flowchart that shows the flow of the collision judging process executed in the step S102.

In steps S201 and S202, based on the rotation number of the engine 42, the controller 21 judges whether or not there has been the collision of the object with the propeller 18 (the propeller hit). First, in the step S201, the controller 21 judges whether or not a propeller hit condition, which indicates that the propeller hit has occurred, is established. Here, the propeller hit condition will be described. First, events 1 to 4 used for the propeller hit condition are listed below.

(The event 1): Satisfying a condition that the rotation number of the engine 42 (hereinafter, referred to as "an engine rotation number") becomes lower than a first threshold rotation number (for example, 100 rpm) within a third predetermined period of time (for example, within 10 ms).

(The event 2): Satisfying a condition that the engine rotation number becomes lower than the minimum rotation number of the engine 42 in a most recent sixth predetermined period of time (for example, 1 second) by a third threshold rotation number (for example, 100 rpm) or more.

(The event 3): Satisfying a condition that the intake pressure of the engine 42 becomes higher than a moving average of the intake pressure of the engine 42 by a predetermined pressure or more.

(The event 4): Satisfying a condition that in a state that the throttle opening is within a predetermined range over a seventh predetermined period of time (for example, 5 seconds), the engine rotation number becomes lower than a fourth threshold rotation number (for example, 100 rpm) within an eighth predetermined period of time (for example, within 100 ms).

The events 1 to 4 are set as conditions to be able to distinguish from a normal deceleration operation. It should be noted that the controller 21 constantly calculates the moving average of the intake pressure of the engine 42. The length of a period, for which the moving average is calculated, does not matter.

In the case that the event 1 has occurred, the controller 21 judges that the propeller hit condition is established. It should be noted that in the case that the event 1 has occurred and at least one of the events 2 to 4 has occurred, the controller 21 may judge that the propeller hit condition is established. Alternatively, in the case that at least one of the events 1 to 4 has occurred, the controller 21 may judge that the propeller hit condition is established.

In the case that the propeller hit condition is not established, the controller 21 advances the collision judging process to a step S203. On the other hand, in the case that the propeller hit condition is established, the controller 21 judges in the step S202 that there has been the propeller hit (there has been the collision of the object with the propeller 18), and then advances the collision judging process to the step S203.

However, even in the case that the propeller hit condition is established in the step S201, an exception, in which it is not judged in the step S202 that there has been the collision of the object with the propeller 18, may be applied. That is, in the case that the engine rotation number does not increase within a ninth predetermined period of time (for example, within 500 ms) after the propeller hit condition is finally established by a fifth threshold rotation number (for example, 100 rpm) or more with respect to an engine rotation number at a point in time when the propeller hit condition is finally established, the controller 21 does not judge that there has been the collision of the object with the propeller 18. As a result, it is possible to accurately judge the propeller hit.

It should be noted that in the following case, the controller 21 may not execute the judgment itself of whether or not the propeller hit condition is established in the step S201. First, the controller 21 obtains the acceleration in the vertical direction acting on the marine vessel 10, and does not execute the judgment of whether or not the propeller hit condition is established during a tenth predetermined period of time (for example, 2 seconds) since a point in time when an acceleration equal to or more than a second predetermined acceleration (for example, 10 G) is obtained. In addition, after satisfying a condition that in a state that the throttle opening is within a predetermined range over an eleventh predetermined period of time (for example, 5 seconds), the engine rotation number rises above a sixth threshold rotation number (for example, 100 rpm) within a twelfth predetermined period of time (for example, within 100 ms), the controller 21 does not execute the judgment of whether or not the propeller hit condition is established within a thirteenth predetermined period of time (for example, within 2 seconds).

As a result, it is not judged whether or not there has been the propeller hit immediately before the marine vessel 10 jumps and lands on the water. Therefore, it is possible to reduce or prevent an erroneous judgment due to the jump of the marine vessel 10. In addition, the controller 21 may not execute the judgment of whether or not the propeller hit condition is established in a situation where there is a possibility of showing a behavior similar to the propeller hit such as at the time of turning on an emergency stop switch (not shown), at the time of the occurrence of an engine stall, or at the time of shift-in.

In the step S203 and a step S204, the controller 21 obtains the acceleration in the horizontal direction acting on the marine vessel 10, and judges whether or not there has been the collision of the object with the marine vessel 10 (the marine vessel hit) based on the obtained acceleration in the horizontal direction. First, in the step S203, the controller 21 judges whether or not a marine vessel hit condition, which indicates that the marine vessel hit has occurred, is established.

Here, the marine vessel hit condition is that the obtained acceleration in the horizontal direction exceeds a first predetermined acceleration. The first predetermined acceleration is set according to the marine vessel speed of the marine vessel 10. For example, the controller 21 sets the first predetermined acceleration by referring to a table (not shown) in which marine vessel speeds and accelerations are associated with each other. This table is stored in the ROM.

In this table, the acceleration is associated with each speed range. It is necessary to reduce or prevent the misrecognition between when riding over a wave and when colliding. Therefore, the acceleration for each speed range is set to a value, which has a lower limit value that is a value obtained by multiplying an acceleration generated when riding over a wave by a value larger than 1 and an upper limit value that is a value obtained by multiplying an acceleration generated by a collision by a value smaller than 1.

For example, the first predetermined acceleration is set to 1 G in the case that the marine vessel speed is 10 km/h or less, and the first predetermined acceleration is set to 24 G in the case that the marine vessel speed is 40 km/h or more. In general, the faster the marine vessel speed is, the larger the first predetermined acceleration is set.

It should be noted that the first predetermined acceleration may be set in response to the direction. Alternatively, the first predetermined acceleration may be set in response to the marine vessel speed and the direction. For example, in a certain speed range, the first predetermined acceleration is set to a larger value in the front-rear direction than in the left-right direction.

In the case that the marine vessel hit condition is not established in the step S203, the controller 21 advances the collision judging process to a step S205. On the other hand, in the case that the marine vessel hit condition is established, the controller 21 judges in the step S204 that there has been the marine vessel hit (there has been the collision of the object with the marine vessel 10), and then advances the collision judging process to the step S205.

In the step S205 and a step S206, the controller 21 obtains the marine vessel speed, and the inclination angle of the outboard motor 12 with respect to the hull 11, and judges whether or not there has been the collision of the object with the outboard motor 12 (the driftwood hit) based on the obtained marine vessel speed and the obtained inclination angle. First, in the step S205, the controller 21 judges whether or not a driftwood hit condition, which indicates that the driftwood hit has occurred, is established. Here, the driftwood hit condition will be described. First, events a to c used for the driftwood hit condition are listed below.

(The event a): In a state in which the marine vessel speed is equal to or higher than a first predetermined speed (for example, 10 km/h), the inclination angle changes by exceeding a first predetermined amount (for example, 10%) within a fourth predetermined period of time (for example, within 100 ms).

(The event b): After the event a occurs, the inclination angle exceeds a first predetermined angle (equivalent to 120%) within a fifteenth predetermined period of time (for example, within 1 second).

(The event c): After the event b occurs, the inclination angle becomes equal to or less than a second predetermined angle (equivalent to 110%) smaller than the first predetermined angle within a sixteenth predetermined period of time (for example, within 1 second).

It should be noted that the first predetermined angle (%) and the second predetermined angle (%) are ratios in the case that the position of the lowest point around the tilt shaft is set to 0% and a boundary between a trim region and a tilt region is set to 100%. 0 to 100% corresponds to an angle of about 15 degrees.

In the step S205, in the case that all of the events a to c have occurred, the controller 21 judges that the driftwood hit condition is established. Therefore, even in the case that the event a occurs, when the inclination angle does not exceed the first predetermined angle within the fifteenth predetermined period of time thereafter, as an exception, it is not judged that the driftwood hit condition is established. In addition, even in the case that the event b occurs, when the inclination angle does not become equal to or less than the second predetermined angle within the sixteenth predetermined period of time thereafter, as an exception, it is not judged that the driftwood hit condition is established.

It should be noted that whether or not the driftwood hit condition is established may be judged only based on the event a. Therefore, it is judged that the driftwood hit condition is established under the condition that in the state in which the marine vessel speed is equal to or higher than the first predetermined speed, the inclination angle changes by exceeding the first predetermined amount within the fourth predetermined period of time.

In the case that the driftwood hit condition is not established in the step S205, the controller 21 ends the collision judging process shown in FIG. 4. On the other hand, in the case that the driftwood hit condition is established, the controller 21 judges in the step S206 that there has been the driftwood hit (there has been the collision of the object with the outboard motor 12), and then ends the collision judging process shown in FIG. 4.

It should be noted that each predetermined period of time described above, each threshold rotation number described above, and each predetermined acceleration described above are not limited to the exemplified values. Also, some of the values called by different names may have the same value. For example, the third predetermined period of time in the claims may be the same as a fifth predetermined period of time. Similarly, the first threshold rotation number may be the same as a second threshold rotation number, and the first predetermined acceleration may be the same as a third predetermined acceleration. In addition, a second predetermined speed, a fourteenth predetermined period of time, and a second predetermined amount may be the same values as the first predetermined speed, the fourth predetermined period of time, and the first predetermined amount, respectively.

FIG. 5 is a diagram that shows a level table in which the driftwood hit level is specified. The level table is stored in the ROM. The driftwood hit level becomes a portion of the collision information obtained in the step S104. In the level table, a change speed (%/s) of the inclination angle, a maximum angle (%) (a change amount of the inclination angle from before the hit), and a hit level are associated with each other.

The controller 21 uses the highest hit level as the driftwood hit level among the hit levels that satisfy both the change speed and the maximum angle. For example, in the case that the change speed is 300 (%/s) and the maximum angle is 60(%), the driftwood hit level is 3. Further, in the case that the change speed is 110 (%/s) and the maximum angle is 121(%), the driftwood hit level is 5. Moreover, in the case that the change speed is 160 (%/s) and the maximum angle is 121(%), the driftwood hit level is 6.

It should be noted that the method of obtaining the driftwood hit level is not limited to the example shown in FIG. 5. An acceleration sensor may be provided in the outboard motor 12, and the driftwood hit level may be obtained from the detection result of the acceleration sensor.

According to a preferred embodiment of the present invention, the controller 21, which functions as a judging unit, judges whether or not there has been the collision of the object with the marine vessel 10 by judging whether or not there has been the propeller hit, the marine vessel hit, or the driftwood hit. Then, the controller 21, which functions as an information obtaining unit, obtains the collision information when it is judged that there has been the collision. Then, the controller 21, which functions as a providing unit, provides the obtained collision information by storing it in the storage unit 29 or wirelessly transmitting it to the server apparatus 34. As a result, it is possible to provide the information about the collision with the marine vessel 10. Therefore, for example, when using the marine vessel 10 for rental or sharing, a lender who lends out the marine vessel 10 is able to in detail and quickly obtain information about whether or not the object has collided with the marine vessel 10 that has been lent out and the state of the collision.

Further, it is possible to provide more detailed information by including the moving images, which includes the point in time when it is judged that there has been the collision, and the information, which indicates the operation state, etc. of the marine vessel 10, in the collision information.

In addition, since the type of the collision to be judged includes the propeller hit, the marine vessel hit, and the driftwood hit, it is possible to identify and notify the situation of the collision.

As for the propeller hit, whether or not there has been the collision of the object with the propeller 18 is judged based on the engine rotation number. In addition, since the events 1 to 4 are provided as events to be used for the propeller hit condition, it is possible to detect many types of the propeller hits. Moreover, even in the case that the propeller hit condition is established, since the exception in which it is not judged that there has been the collision of the object with the propeller 18 and a period during which the judgment itself of whether or not the propeller hit condition is established is not executed are provided, it is possible to reduce or prevent the erroneous judgment.

As for the marine vessel hit, whether or not there has been the collision of the object with the marine vessel 10 is judged based on the acceleration in the horizontal direction acting on the marine vessel 10. In particular, since the first predetermined acceleration, which is compared with the acceleration in the horizontal direction, is set in response to the marine vessel speed (or in response to the marine vessel speed and the direction), it is possible to more accurately judge whether or not there has been the collision of the object with the marine vessel 10.

As for the driftwood hit, whether or not there has been the collision of the object with the outboard motor 12 is judged based on the marine vessel speed and the inclination angle of the outboard motor 12. In particular, in principle, in the case that all of the events a to c have occurred, it is judged that the driftwood hit condition is established. In addition, by providing the exception in which it is not judged that the driftwood hit condition is established even when the event a or the event b has occurred, it is possible to further reduce or prevent the erroneous judgment.

In addition, by including the driftwood hit level in the collision information, it is possible to inform the extent of the driftwood hit.

In addition, the events to be used for the propeller hit condition are not limited to the events 1 to 4 described above. For example, it may be judged that the propeller hit has occurred as a result of the occurrence of each event in stages. Moreover, the ECU 41 (the judging unit) of the outboard motor 12 may judge whether or not the propeller hit has occurred, instead of the controller 21 of the hull 11.

Figure 6:
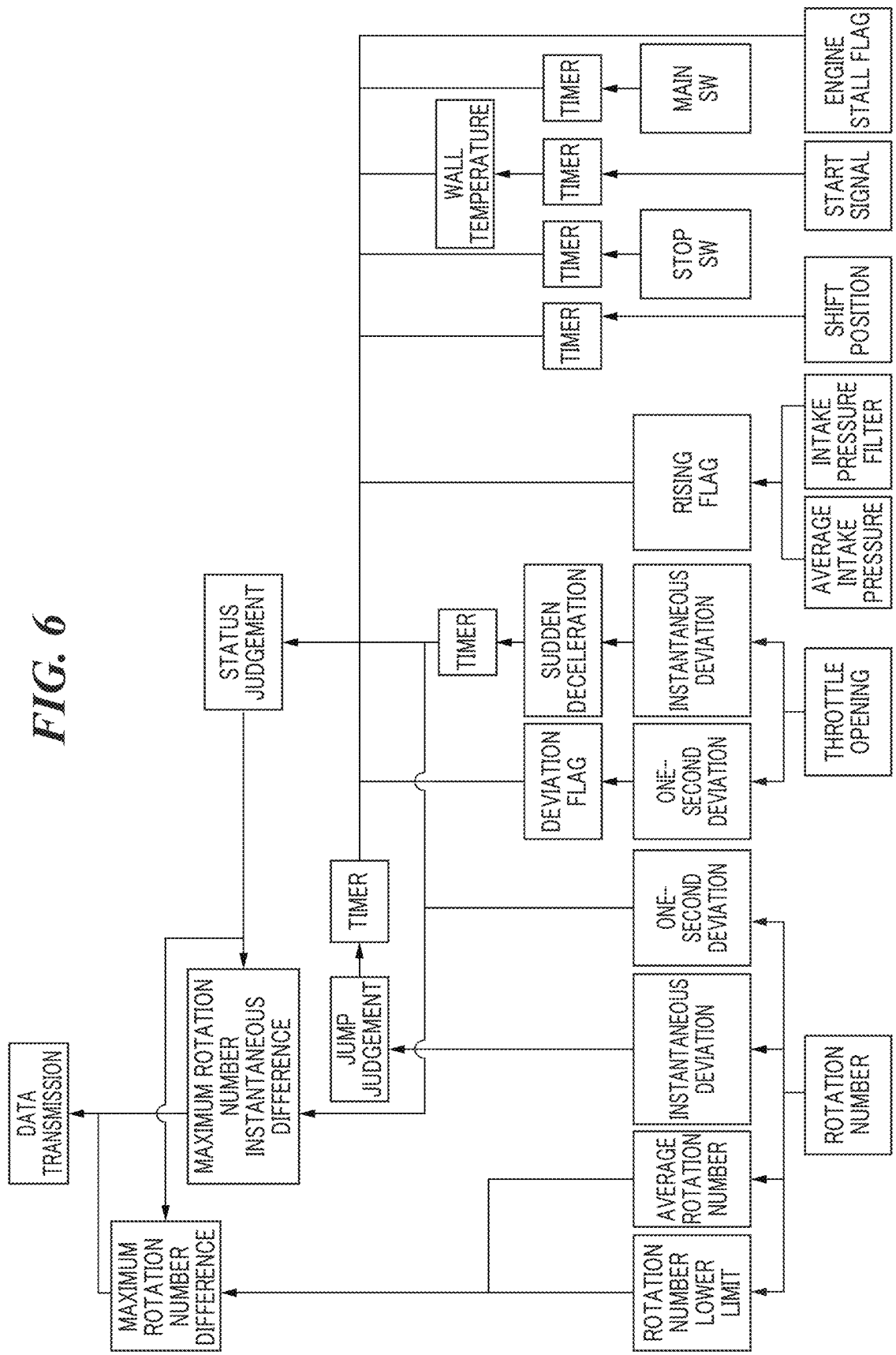
FIG. 6 is a diagram for explaining data used by an ECU to judge the occurrence of a propeller hit.
Figure 7:
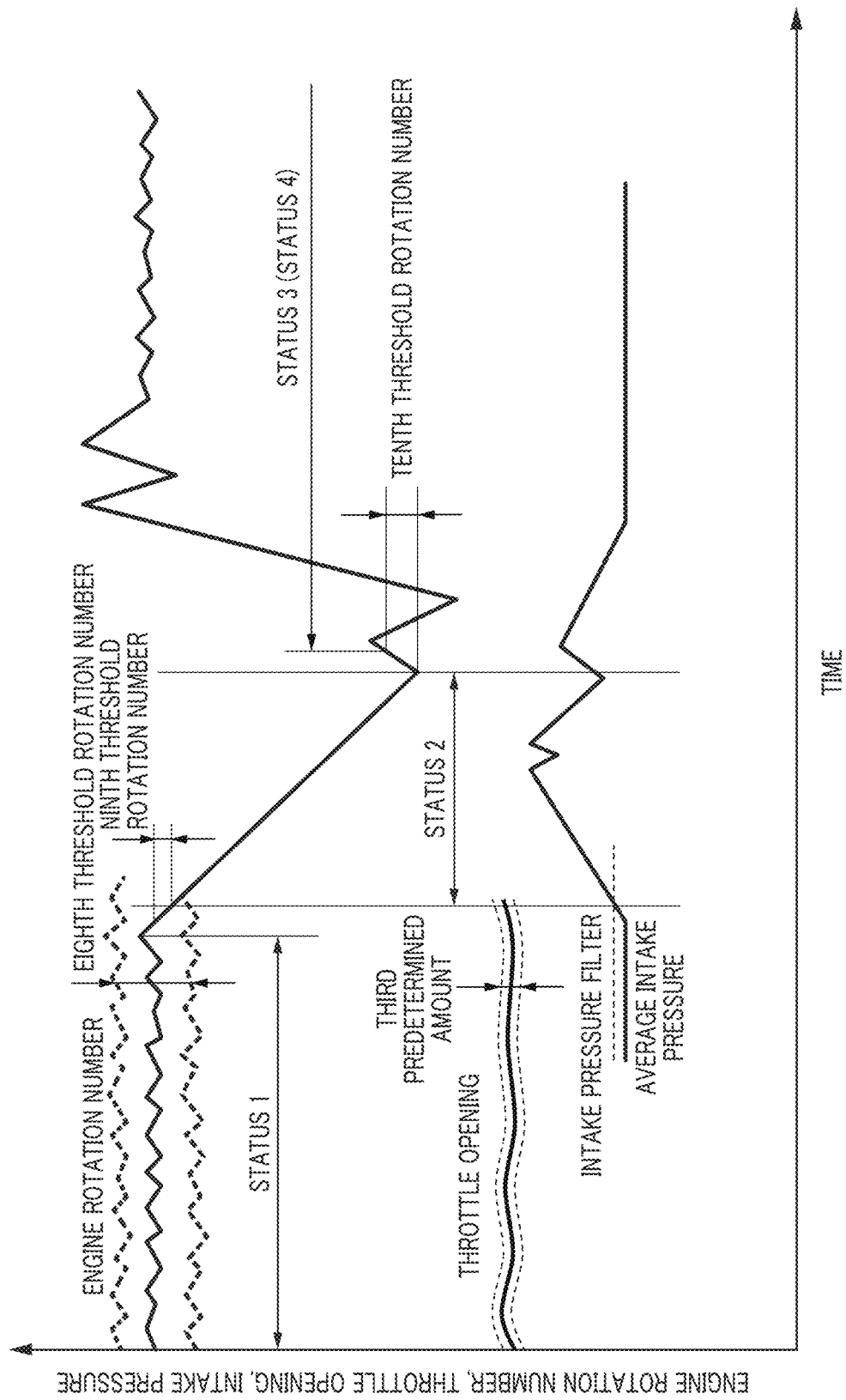
FIG. 7 is a diagram for explaining an example of a procedure to judge the occurrence of the propeller hit, which is performed by the ECU.

FIG. 6 is a diagram for explaining data used by the ECU 41 to judge the occurrence of the propeller hit. FIG. 7 is a diagram for explaining an example of a procedure to judge the occurrence of the propeller hit, which is performed by the ECU 41.

The ECU 41 obtains the engine rotation number from the rotation number sensor 43, obtains the opening of the throttle valve (the throttle opening) from the throttle opening sensor 44, obtains the intake pressure of the engine 42 from the intake pressure sensor 45, and obtains the current shift position of the forward moving/backward moving switching mechanism 46 from the shift position sensor 47. Then, when the shift position of the forward moving/backward moving switching mechanism 46 is changed, the ECU 41 starts a shift position timer (not shown) to clock an elapsed time.

In addition, as the intake pressure of the engine 42, the ECU 41 obtains an average intake pressure which is a moving average value of the intake pressure during a predetermined period of time (for example, several milliseconds) retroactively from the present time and becomes an index of the current intake pressure, and an intake pressure filter value (a predetermined intake pressure threshold) which is a value that is blunted by multiplying the intake pressure by a certain coefficient and whose change lags behind the average intake pressure.

Furthermore, based on the obtained engine rotation number, the ECU 41 obtains a minimum engine rotation number (a rotation number lower limit) during a seventeenth predetermined period of time (for example, 1 second) retroactively from the present. Further, the ECU 41 obtains an average value of the engine rotation number (an average rotation number) when the current situation has shifted to a status 2, which will be described below.

Furthermore, the ECU 41 obtains a change amount of the engine rotation number during a nineteenth predetermined period of time (for example, 10 milliseconds) retroactively from the present as an instantaneous deviation of the engine rotation number (a second deviation of the rotation number of the engine). Then, in the case that the instantaneous deviation of the engine rotation number exceeds a seventh threshold rotation number, the ECU 41 obtains a jump judgment signal. Furthermore, when the ECU 41 obtains the jump judgment signal, the ECU 41 starts a jump timer (not shown) to clock an elapsed time. In addition, the ECU 41 obtains a deviation of the engine rotation number during the seventeenth predetermined period of time retroactively from the present time as a one-second deviation of the engine rotation number (a first deviation of the rotation number of the engine).

Further, based on the obtained throttle opening, the ECU 41 obtains a deviation of the throttle opening during a twentieth predetermined period of time (for example, 1 second) retroactively from the present (a first deviation of the throttle opening) as a one-second deviation of the throttle opening. Then, the ECU 41 obtains a throttle opening deviation flag, which indicates whether or not the one-second deviation of the throttle opening exceeds a third predetermined amount. In the case that the one-second deviation of the throttle opening exceeds the third predetermined amount, the throttle opening deviation flag becomes "0". On the other hand, in the case that the one-second deviation of the throttle opening does not exceed the third predetermined amount, the throttle opening deviation flag becomes "1".

Furthermore, the ECU 41 obtains a change amount of the throttle opening during a twenty-first predetermined period of time (for example, 10 milliseconds) retroactively from the present as an instantaneous deviation of the throttle opening. Then, in the case that the instantaneous deviation of the throttle opening exceeds a fourth predetermined amount and a sudden deceleration condition is established, the ECU 41 obtains a sudden deceleration signal. Furthermore, when the ECU 41 obtains the sudden deceleration signal, the ECU 41 starts a sudden deceleration timer (not shown) to clock an elapsed time.

Further, when the average intake pressure exceeds the intake pressure filter value, the ECU 41 obtains an intake pressure rising flag. The intake pressure rising flag becomes "1" when the average intake pressure exceeds the intake pressure filter value.

Furthermore, when the ECU 41 obtains a stop switch signal (indicated by "stop SW" in FIG. 6) indicating that a stop switch (not shown) to stop the engine 42 is turned on, the ECU 41 starts a stop switch timer (not shown) to clock an elapsed time. Further, when the ECU 41 obtains a start signal to start the engine 42, the ECU 41 starts a start switch timer (not shown) to clock an elapsed time, and further obtains a wall temperature of the engine 42 from a wall temperature sensor (not shown).

Further, when the ECU 41 obtains a main switch signal (indicated by "main SW" in FIG. 6) indicating that a main switch (not shown) to supply power to respective components of the outboard motor 12, the ECU 41 starts a main switch timer (not shown) to clock an elapsed time. Furthermore, when the engine 42 in operation has stopped, the ECU 41 obtains an engine stall flag. The engine stall flag becomes "1" when the engine 42 has stopped.

Based on the various kinds of data described above, the ECU 41 judges in stages whether or not the current situation has shifted to the following four statuses.

(Status 1): A state in which no propeller hit occurs and the rotation of the propeller 18 is stable (Status 2): A state in which an object collides with the propeller 18 and the rotation number of the engine 42 directly linked to the propeller 18 is greatly reduced, and a preparatory stage to judge the occurrence of the propeller hit (Status 3): A state in which the object is separated from the propeller 18 and the rotation number of the engine 42 directly linked to the propeller 18 is recovered, and a stage at which it is judged that the propeller hit has occurred (Status 4): A state in which the status 3 is maintained for a twenty-second predetermined period of time Specifically, in the case that the throttle opening deviation flag is "1" and the one-second deviation of the engine rotation number is within an eighth threshold rotation number, the ECU 41 judges that the current situation has shifted to the status 1. The fact that the throttle opening deviation flag is "1" indicates that the one-second deviation of the throttle opening does not exceed the third predetermined amount and that the amount of throttle operation is maintained almost constant and the throttle opening is stable. In addition, the fact that the one-second deviation of the engine rotation number is within the eighth threshold rotation number indicates that the engine rotation number is stable and does not fluctuate.

Moreover, a state in which the throttle opening deviation flag is "1" is represented in FIG. 7 by a state in which a solid line indicating the throttle opening is positioned within a range of the third predetermined amount indicated by dashed lines. Furthermore, a state in which the one-second deviation of the engine rotation number is within the eighth threshold rotation number is represented in FIG. 7 by a state in which a solid line indicating the engine rotation number is positioned within a range of the eighth threshold rotation number indicated by dashed lines.

Next, in the case that the intake pressure rising flag is "1" and the engine rotation number has decreased so that the instantaneous deviation of the engine rotation number exceeds a ninth threshold rotation number, the ECU 41 judges that the current situation has shifted to the status 2. The fact that the engine rotation number decreases so that the instantaneous deviation of the engine rotation number exceeds the ninth threshold rotation number indicates that the rotation number of the engine 42, which has decreased due to the object colliding with the propeller 18, has greatly decreased. Furthermore, the fact that the intake pressure rising flag is "1" indicates that as a result of the ECU 41 increasing the throttle opening in an attempt to recover the rotation number of the engine 42, which has greatly decreased due to the object colliding with the propeller 18, the amount of air taken in by the engine 42 increases and the average intake pressure exceeds the intake pressure filter value.

Moreover, since the engine rotation number sometimes fluctuates due to factors other than the propeller hit, in a preferred embodiment of the present invention, a shift condition from the status 1 to the status 2 includes not only that the engine rotation number has decreased so that the instantaneous deviation of the engine rotation number exceeds the ninth threshold rotation number but also that the intake pressure rising flag is "1". As a result, it is possible to reduce or prevent the erroneous detection of the occurrence of the propeller hit.

Next, in the case that the engine rotation number has increased so that the instantaneous deviation of the engine rotation number exceeds a tenth threshold rotation number before a twenty-third predetermined period of time elapses after the current situation has shifted to the status 2, the ECU 41 judges that the current situation has shifted to the status 3 and judges that the propeller hit has occurred for the first time at this point in time. Furthermore, the fact that the engine rotation number increases so that the instantaneous deviation of the engine rotation number exceeds the tenth threshold rotation number indicates that the colliding object is separated from the propeller 18 and the rotation number of the engine 42 is recovered.

In addition, when the current situation shifts to the status 3, the ECU 41 transmits a maximum rotation number difference (a first rotation number difference), which is a difference between the average rotation number and the rotation number lower limit, and a maximum rotation number instantaneous difference (a second rotation number difference), which is a maximum value among the instantaneous deviations of the respective engine rotation number during a twenty-fourth predetermined period of time (for example, 1 second) retroactively from the present, to the external server apparatus 34.

Here, it is conceivable that a decrease amount of the engine rotation number changes in response to a degree of the collision between the propeller 18 and the object. For example, when the propeller 18 collides violently with the object, the decrease amount of the engine rotation number increases. Therefore, it can be said that the maximum rotation number difference and the maximum rotation number instantaneous difference corresponding to the decrease amount of the engine rotation number are indicators of a degree of damage to the propeller 18 and the engine 42 due to the collision with the object (a damage degree). Then, the server apparatus 34 estimates the damage degree of the propeller 18 and the engine 42 based on the transmitted maximum rotation number difference and the transmitted maximum rotation number instantaneous difference. As a result, the lender who lends out the marine vessel 10 is able to grasp the damage degree of the propeller 18 and the engine 42 of the marine vessel 10 caused by the propeller hit. It should be noted that the ECU 41 may transmit only one of the maximum rotation number difference and the maximum rotation number instantaneous difference to the server apparatus 34.

After that, the ECU 41 shifts to the status 4 and maintains the status 3 until the twenty-second predetermined period of time elapses. During this period of time, for example, even in the case that the engine rotation number increases so that the instantaneous deviation of the engine rotation number again exceeds the tenth threshold rotation number, the ECU 41 does not judge that the propeller hit has occurred again, and maintains the status 3.

By the way, since the propeller 18 includes a plurality of the blades, as the propeller 18 rotates, sometimes the collision between the same object and the respective blades occurs repeatedly, even in the case that the engine rotation number decreases and increases repeatedly in a relatively short period of time, it is highly likely that these engine rotation number decreases and increases are caused by the collision with the same object.

Therefore, as described above, in the status 4, even in the case that the engine rotation number increases so that the instantaneous deviation of the engine rotation number again exceeds the tenth threshold rotation number, by not judging that the propeller hit has occurred again, it is possible to prevent repeated detection of the occurrence of the propeller hit due to the collision with the same object.

In addition, in the status 4, when the maximum rotation number difference and the maximum rotation number instantaneous difference are updated due to a fluctuation in the engine rotation number, the ECU 41 transmits the updated maximum rotation number difference and the updated maximum rotation number instantaneous difference to the server apparatus 34. On the other hand, in the case that the maximum rotation number difference and the maximum rotation number instantaneous difference are not updated, the ECU 41 continues to transmit the same maximum rotation number difference and the same maximum rotation number instantaneous difference to the server apparatus 34.

In the preferred embodiments of the present invention, as described above, although the ECU 41 detects the occurrence of the propeller hit mainly based on the fluctuation in the engine rotation number, the engine rotation number also changes due to various factors other than the propeller hit. Therefore, in order to avoid the erroneous detection of the occurrence of the propeller hit, in the case that any one of specific conditions to be described below is satisfied, the ECU 41 does not perform the detection of the occurrence of the propeller hit.

For example, in the case that the engine stall flag is "1", since the engine 42 is stopped and the propeller 18 is not rotating, the propeller hit cannot occur. Therefore, in the case that the engine stall flag is "1", the ECU 41 does not perform the detection of the occurrence of the propeller hit.

Further, since the change of the shift position is accompanied by the change of the throttle opening, the engine rotation number fluctuates for a while. Therefore, in the case that the elapsed time clocked by the shift position timer does not exceed a twenty-fifth predetermined period of time, which corresponds to the case that the shift position has just been changed, the ECU 41 does not perform the detection of the occurrence of the propeller hit.

Moreover, sometimes the stop switch is turned on for a moment when the marine vessel user's elbow, etc. touches the stop switch unintentionally, and then the marine vessel user realizes the erroneous operation and turns off the stop switch. In such a case, since the engine 42 is momentarily stopped, the fluctuation in the engine rotation number continues for a while. Therefore, in the case that the elapsed time clocked by the stop switch timer does not exceed a twenty-sixth predetermined period of time, which corresponds to the case that the stop switch is just turned off after the stop switch is turned on once, the ECU 41 does not perform the detection of the occurrence of the propeller hit.

In addition, the engine rotation number fluctuates without being stabilized for a while immediately after the engine 42 is started. Therefore, in the case that the elapsed time clocked by the start switch timer does not exceed a twenty-seventh predetermined period of time, which corresponds to the case that immediately after starting the engine 42, and the wall temperature of the engine 42 does not exceed a predetermined temperature, the ECU 41 does not perform the detection of the occurrence of the propeller hit.

Furthermore, in the case that the marine vessel 10 suddenly decelerates, since the throttle opening suddenly decreases, the engine rotation number fluctuates for a while. Therefore, in the case that the elapsed time clocked by the sudden deceleration timer does not exceed a twenty-eighth predetermined period of time, which corresponds to the case that the marine vessel 10 has just suddenly decelerated, the ECU 41 does not perform the detection of the occurrence of the propeller hit.

Further, when the marine vessel 10 jumps and takes off from the water, the idling of the propeller 18 occurs, the engine rotation number increases suddenly, and the engine rotation number fluctuates for a while. Therefore, in the case that the elapsed time clocked by the jump timer does not exceed a twenty-ninth predetermined period of time, which corresponds to the case that shortly after the marine vessel 10 has jumped, the ECU 41 does not perform the detection of the occurrence of the propeller hit.

Furthermore, in the case that the marine vessel user intentionally changes the throttle opening by operating the lever of the remote controller 22, the engine rotation number fluctuates for a while until it settles down to a rotation number corresponding to an operation amount of the lever. Therefore, in the case that the throttle opening deviation flag is "0", which corresponds to the case that the marine vessel user intentionally changes the throttle opening, the ECU 41 does not perform the detection of the occurrence of the propeller hit.

In addition, the main switch is a switch to supply the power to the respective components of the outboard motor 12, and turning on the main switch is not directly related to starting the engine 42 and rotating the propeller 18. Therefore, in the case that the elapsed time clocked by the main switch timer does not exceed a thirtieth predetermined period of time, which corresponds to the case that shortly after the main switch is turned on, the ECU 41 does not perform the detection of the occurrence of the propeller hit.

All of the data used in the above-described detection of the occurrence of the propeller hit performed by the ECU 41 is able to be obtained by the existing sensors, etc. of the outboard motor 12. Therefore, it is not necessary to provide additional sensors, etc. in order to perform the detection of the occurrence of the propeller hit, and it is possible to suppress the cost.

It should be noted that the above-described detection of the occurrence of the propeller hit performed by the ECU 41 may be performed by the controller 21 of the hull 11.

The present invention is also able to be implemented by a process of supplying a program that realizes one or more functions of the above-described preferred embodiments to a system or an apparatus via a network or a non-transitory storage medium, and one or more processors of a computer of the system or the apparatus reading out the program and executing it. The above program and a storage medium storing the above program may define a preferred embodiment of the present invention. In addition, a preferred embodiment of the present invention is also able to be implemented by a circuit (for example, an ASIC (application specific integrated circuit)) that implements one or more functions.

It should be noted that the type of the collision to be judged may be at least one of the propeller hit, the marine vessel hit, and the driftwood hit. Therefore, unless contradictory, preferred embodiments of the present invention are applicable not only to marine vessels including outboard motors, but also to various types of marine vessels and jet boats that are propelled by inboard motors or inboard/outboard motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A collision information providing system comprising:
a controller configured or programmed to:
judge whether or not there has been a collision of an object with a marine vessel;
obtain information about the collision when the controller judges that there has been the collision; and
provide the information obtained by the controller; and
a camera to photograph moving images; wherein
the controller is configured or programmed to obtain a photograph of the moving images, as a portion of the information, for a first predetermined period of time which includes a point in time when it is judged that there has been the collision.

2. The collision information providing system according to claim 1, further comprising:
a storage; wherein
the controller is configured or programmed to store the information in the storage.

3. The collision information providing system according to claim 1, further comprising:
a communicator; wherein
the controller is configured or programmed to transmit the information to outside the collision information providing system via the communicator.

4. The collision information providing system according to claim 1, further comprising:
an acceleration sensor to obtain an acceleration in a horizontal direction acting on the marine vessel; wherein
the controller is configured or programmed to judge whether or not there has been a collision of an object with the marine vessel based on the acceleration obtained by the acceleration sensor.

5. A marine vessel comprising:
the collision information providing system according to claim 1.

6. A collision information providing system comprising:
a controller configured or programmed to:
judge whether or not there has been a collision of an object with a marine vessel;
obtain information about the collision when the controller judges that there has been the collision; and
provide the information obtained by the controller; wherein
the controller is configured or programmed to obtain information that indicates an operation state of the marine vessel for a second predetermined period of time including a point in time when it is judged that there has been the collision.

7. A collision information providing system comprising:
a controller configured or programmed to:
judge whether or not there has been a collision of an object with a marine vessel;
obtain information about the collision when the controller judges that there has been the collision; and
provide the information obtained by the controller; wherein
the marine vessel includes at least one marine vessel propulsion device to propel the marine vessel;
the marine vessel propulsion device includes an engine and a propeller;
the controller is configured or programmed to judge whether or not there has been a collision of an object with the propeller of the marine vessel based on a rotation number of the engine; and
in a case that a condition that the rotation number of the engine becomes lower than a first threshold rotation number within a third predetermined period of time is satisfied, the controller is configured or programmed to judge that there has been the collision of the object with the propeller.

8. A collision information providing system comprising:
a controller configured or programmed to:
judge whether or not there has been a collision of an object with a marine vessel;
obtain information about the collision when the controller judges that there has been the collision; and
provide the information obtained by the controller; wherein
the marine vessel includes a hull and at least one marine vessel propulsion device attached to the hull;
the collision information providing system further comprises a speed sensor to obtain a speed of the marine vessel and an inclination angle sensor to obtain an inclination angle of the marine vessel propulsion device with respect to the hull; and
the controller is configured or programmed to judge whether or not there has been a collision of an object with the marine vessel propulsion device of the marine vessel based on the speed obtained by the speed sensor and the inclination angle obtained by the inclination angle sensor.

9. The collision information providing system according to claim 8, wherein the controller is configured or programmed to judge that there has been the collision of the object with the marine vessel propulsion device based on a condition that, in a state in which the obtained speed is equal to or higher than a first predetermined speed, the obtained inclination angle has changed by more than a first predetermined amount within a fourth predetermined period of time.

10. A collision judging system comprising:
a controller configured or programmed to:
judge whether or not there has been a collision of an object with a marine vessel propulsion device including an engine and a propeller; wherein when a rotation number of the engine becomes lower than a second threshold rotation number within a fifth predetermined period of time is satisfied, the controller is configured or programmed to judge that there has been the collision of the object with the propeller.

11. The collision judging system according to claim 10, wherein, when a condition that the rotation number of the engine becomes lower than a minimum rotation number of the engine in a most recent sixth predetermined period of time by a third threshold rotation number or more is satisfied, the controller is configured or programmed to judge that there has been the collision of the object with the propeller.

12. The collision judging system according to claim 10, wherein, the controller is configured or programmed to calculate a moving average of an intake pressure of the engine, and when a condition that the intake pressure of the engine becomes higher than the moving average by a predetermined pressure or more is satisfied, to judge that there has been the collision of the object with the propeller.

13. The collision judging system according to claim 10, wherein, when a condition that, in a state that a throttle opening of the engine is within a predetermined range over a seventh predetermined period of time, and the rotation number of the engine becomes lower than a fourth threshold rotation number within an eighth predetermined period of time is satisfied, the controller is configured or programmed to judge that there has been the collision of the object with the propeller.

14. The collision judging system according to claim 10, wherein, even when the condition is satisfied that the throttle opening of the engine is within the predetermined range over the seventh predetermined period of time, and the rotation number of the engine becomes lower than the fourth threshold rotation number within the eighth predetermined period of time is satisfied, and when the rotation number of the engine does not increase within a ninth predetermined period of time after the condition is finally satisfied by a fifth threshold rotation number or more with respect to a rotation number of the engine at a point in time when the condition is finally satisfied, the controller is configured or programmed not to judge that there has been the collision of the object with the propeller.

15. The collision judging system according to claim 10, wherein the controller is configured or programmed to obtain an acceleration in a vertical direction acting on a marine vessel propelled by the marine vessel propulsion device, and not to judge whether or not there has been the collision of the object with the propeller during a tenth predetermined period of time since a point in time when an acceleration equal to or more than a second predetermined acceleration is obtained.

16. The collision judging system according to claim 10, wherein, when a condition that, in a state that a throttle opening of the engine is within a predetermined range over an eleventh predetermined period of time, and the rotation number of the engine rises above a sixth threshold rotation number within a twelfth predetermined period of time, the controller is configured or programmed not to judge whether or not there has been the collision of the object with the propeller within a thirteenth predetermined period of time.

17. A marine vessel comprising:
the collision judging system according to claim 10.

18. A collision judging system comprising:
a controller configured or programmed to:

judge whether or not there has been a collision of an object with a propeller of a marine vessel propulsion device; wherein
when a first deviation of a throttle opening of an engine of the marine vessel propulsion device during a twentieth predetermined period of time retroactively from a present time does not exceed a third predetermined amount and a first deviation of a rotation number of the engine during a seventeenth predetermined period of time retroactive from the present time is within an eighth threshold rotation number, and when a moving average of an intake pressure of the engine exceeds a predetermined intake pressure threshold and the rotation number of the engine has decreased so that a second deviation of the rotation number of the engine during a nineteenth predetermined period of time retroactive from the present time exceeds a ninth threshold rotation number and then the rotation number of the engine has increased so that the second deviation of the rotation number of the engine exceeds a tenth threshold rotation number, the controller is configured or programmed to judge that there has been the collision of the object with the propeller.

19. The collision judging system according to claim 18, wherein, in a case of judging that there has been the collision of the object with the propeller, the controller is configured or programmed to obtain a first rotation number difference, which is a difference between an average value of the rotation number of the engine when the moving average of the intake pressure of the engine exceeds the predetermined intake pressure threshold and the rotation number of the engine has decreased so that the second deviation of the rotation number of the engine exceeds the ninth threshold rotation number and a minimum rotation number of the engine during the seventeenth predetermined period of time retroactive from the present time, obtain a second rotation number difference, which is a maximum value among the second deviations of the rotation number of the respective engines during a twenty-fourth predetermined period of time retroactive from the present time, and to transmit at least one of the first rotation number difference or the second rotation number difference to outside of the collision judging system.

20. The collision judging system according to claim 18, wherein, even in a case that the rotation number of the engine has increased until a twenty-second predetermined period of time elapses after judging that there has been the collision of the object with the propeller so that the second deviation of the rotation number of the engine again exceeds the tenth threshold rotation number, the controller is configured or programmed not to judge again that there has been the collision of the object with the propeller.

21. The collision judging system according to claim 18, wherein, when the engine of the marine vessel propulsion device is stopped, the controller is configured or programmed not to judge that there has been the collision of the object with the propeller.

22. The collision judging system according to claim 18, wherein the controller is configured or programmed not to judge that there has been the collision of the object with the propeller until a twenty-fifth predetermined period of time elapses after a shift position of the marine vessel propulsion device is changed.

23. The collision judging system according to claim 18, wherein the controller is configured or programmed not to judge that there has been the collision of the object with the propeller until a twenty-sixth predetermined period of time elapses after a stop switch of the marine vessel propulsion device is turned on.

24. The collision judging system according to claim 18, wherein, in a case that a twenty-seventh predetermined period of time has not elapsed since the engine of the marine vessel propulsion device is started and a wall temperature of the engine does not exceed a predetermined temperature, the controller is configured or programmed not to judge that there has been the collision of the object with the propeller.

25. The collision judging system according to claim 18, wherein the controller is configured or programmed not to judge that there has been the collision of the object with the propeller until a twenty-eighth predetermined period of time elapses after a sudden deceleration condition of a marine vessel propelled by the marine vessel propulsion device is established.

26. The collision judging system according to claim 18, wherein the controller is configured or programmed not to judge that there has been the collision of the object with the propeller until a twenty-ninth predetermined period of time elapses after a marine vessel propelled by the marine vessel propulsion device has jumped from water.

27. The collision judging system according to claim 18, wherein, in a case that the throttle opening is changed by a marine vessel user and the first deviation of the throttle opening exceeds the third predetermined amount, the controller is configured or programmed not to judge that there has been the collision of the object with the propeller.

28. The collision judging system according to claim 18, wherein the controller is configured or programmed not to judge that there has been the collision of the object with the propeller until a thirtieth predetermined period of time elapses after a main switch of the marine vessel propulsion device is turned on.

29. A collision judging system comprising:
an acceleration sensor to obtain an acceleration in a horizontal direction acting on a marine vessel; and
a controller configured or programmed to:
  judge whether or not there has been a collision of an object with the marine vessel; wherein
when the acceleration obtained by the acceleration sensor exceeds a third predetermined acceleration, the controller is configured or programmed to judge that there has been the collision of the object with the marine vessel; and
the third predetermined acceleration is set in response to at least a marine vessel speed.

30. A collision judging system comprising:
an acceleration sensor to obtain an acceleration in a horizontal direction acting on a marine vessel; and
a controller configured or programmed to:
  judge whether or not there has been a collision of an object with the marine vessel; wherein
when the acceleration obtained by the acceleration sensor exceeds a third predetermined acceleration, the controller is configured or programmed to judge that there has been the collision of the object with the marine vessel; and
the third predetermined acceleration is set in response to at least a direction of the marine vessel.

31. A collision judging system comprising:
a speed sensor to obtain a speed of a marine vessel including a hull and at least one marine vessel propulsion device attached to the hull;
an inclination angle sensor to obtain an inclination angle of the marine vessel propulsion device with respect to the hull; and
a controller configured or programmed to:
  judge whether or not there has been a collision of an object with the marine vessel propulsion device; wherein
the controller is configured or programmed to judge that there has been the collision of the object with the marine vessel propulsion device based on a condition that a speed obtained by the speed sensor is equal to or higher than a second predetermined speed, and the inclination angle obtained by the inclination angle sensor has changed by more than a second predetermined amount within a fourteenth predetermined period of time.

32. The collision judging system according to claim 31, wherein, even when the condition is established that the speed obtained by the speed sensor is equal to or higher than the second predetermined speed, and the inclination angle obtained by the inclination angle sensor has changed by more than the second predetermined amount within the fourteenth predetermined period of time, when the inclination angle does not exceed a first predetermined angle within a fifteenth predetermined period of time thereafter, the controller is configured or programmed not to judge that there has been the collision of the object with the marine vessel propulsion device.

* * * * *